United States Patent [19]

Favier et al.

[11] 3,879,706

[45] Apr. 22, 1975

[54] METHOD AND DEVICE FOR THE AUTOMATIC SELECTION OF CHROMOSOME IMAGES DURING METAPHASE

[75] Inventors: Charles Favier, Lyon; Roland Le Go, Antony; Edmond Tournier, Grenoble, all of France

[73] Assignee: Commissariat A L' Energie Atomique, Paris, France

[22] Filed: Oct. 27, 1972

[21] Appl. No.: 301,482

[30] Foreign Application Priority Data

Nov. 3, 1971 France ............................ 71.39422

[52] U.S. Cl. ............... 340/146.3 R; 250/219 R; 250/219 CR; 356/39

[51] Int. Cl. ............................................ G06k 9/12

[58] Field of Search ......... 128/1 R, 2 R; 73/432 PS; 178/DIG. 22; 340/146.3 R, 146.3 AC; 356/39; 444/1; 250/219 R, 219 CR, 219 FR, 220 M, 332, 334, 359-360

[56] References Cited

UNITED STATES PATENTS

| | | | |
|---|---|---|---|
| 3,214,574 | 10/1965 | Landsman et al. | 250/220 M |
| 3,315,229 | 4/1967 | Smithline | 340/146.3 R |
| 3,705,383 | 12/1972 | Frayer | 340/146.3 R |

*Primary Examiner*—Malcolm A. Morrison

*Assistant Examiner*—R. Stephen Dildine, Jr.

*Attorney, Agent, or Firm*—Ernest F. Marmorek

[57] ABSTRACT

Each chromosome image is subdivided to form a lattice of adjacent rectangles arranged in lines and columns. A binary value of 1 or 0 is assigned to each rectangle depending on whether the optical density of the rectangle is either within a range defined by two preset threshold levels or outside this range. A decision algorithm is then employed to distinguish a characteristic spatial dispersion among the rectangles which have the assigned value of 1.

The device for carrying out the method comprises a column of detectors in aligned relation for converting an optical density into an electrical quantity. Each detector covers one rectangle of the column and the complete set of detectors covers the entire column.

11 Claims, 6 Drawing Figures

METHOD AND DEVICE FOR THE AUTOMATIC SELECTION OF CHROMOSOME IMAGES DURING METAPHASE

This invention relates to a method and a device for the automatic selection of metaphase images.

Chromosome analyses at present constitute an essential study in numerous fields of human science and biological disciplines (clinical genetics, carcinology, radiopathology, pediatrics and the like). Analyses of chromosomes in man are based on a technique which makes use of a culture of blood lymphocytes, said culture being maintained for a period of 48 hours in the presence of the pHA antigen (phytohemagglutinin) and stopped at the end of this period by introduction of colchicine. A hypotonic shock then serves to initiate swelling of the cells during division (at the metaphase stage of mitosis), thus prŏviding a more effective separation of their chromosomes.

At the moment of collection, the few drops of culture are spread over the microscope slide and the cells contained therein spread their chromosomes on the surface of the slide. However, over the entire surface of a preparation which is thus made, the percentage of metaphases having well dispersed chromosomes is extremely low with respect to the total number of images of no interest, namely those which are constituted in particular by nuclei of nondivided cells and uncompleted mitoses.

A first task of the biologist therefore consists in studying the different samples in order to select those which exhibit a metaphase having well dispersed chromosomes. This selection of suitable images is carried out under a microscope in two steps, namely a first rough selection followed by a finer selection. This research is extremely tedious and time-consuming.

The precise object of the present invention is to propose a method and a device permitting complete automation of the selection of metaphase chromosome figures in order to extract those which are usable, that is to say those which exhibit a sufficient dispersion of chromosomes.

There are already a number of methods for the automatic detection of metaphase images, two of which are worthy of mention :

The first method is illustrated in FIGS. 1*a* and 1*b*. There is shown in FIG. 1*a* a metaphase image 2 and a particular chromosome 4. The chromosomes are presented diagrammatically in the form of an X. If the image 2 is scanned with a detector in horizontal lines of displacement (6*a*, 6*b* etc.), the detector will encounter a brightly illuminated zone, then a relatively dark zone D, then again a bright zone followed by a dark zone E and once again a bright zone. The zones D and E obviously correspond to the arms of the X representing the chromosome. Two pulses D and E appear at the level of the signal received (FIG. 1*b*) by the detector and are characteristic of the presence of a chromosome which is well separated from the others. In this method, it is acknowledged that an image of correctly dispersed metaphase chromosomes is obtained if the characteristic signal is detected a certain number of times. The disadvantages of this method are clearly apparent. For example, if all the chromosomes were to occupy a parallel position in the direction of scanning of the images, the characteristic signal would not be obtained at any moment and the image would be rejected although the chromosomes might have a suitable dispersion.

Another method consists in subjecting the preparation to a laser beam. The information is collected in the Fourier plane. In other words, the signals received will be processed directly in the form of a Fourier transform. This method calls for the use of a powerful computer for the processing of signals, with the result that the use of this method is made both complex and costly.

The precise object of this invention is to provide a method and a device for the automatic selection of metaphases which overcomes the disadvantages of the methods mentioned in the foregoing.

The method is characterized in that each image to be tested is subdivided to form a lattice of adjacent rectangles which are distributed in lines and columns,

- there is assigned to each rectangle a binary value of 1 or 0, depending on whether the optical density of said rectangle is comprised or not between two preset threshold levels,
- the arrangement of the rectangles having the assigned value of 1 is compared with a preset decision algorithm.

More precisely, the optical density of each rectangle of the lattice is measured and compared with a maximum threshold value and a minimum threshold value. The binary value of 1 is assigned to the rectangles whose optical density is comprised between the two threshold values while storing in memory the position of the rectangle on the image. The arrangement of the rectangles having the assigned value of 1 is compared with a preset decision algorithm. Said decision algorithm, which is established on the basis of prior experimental results, serves to select the metaphase images which exhibit good dispersion and are therefore usable.

As is consequently apparent, this method can be employed irrespective of the procedure adopted for measuring the optical density of each rectangle. It is equally possible either to measure successively the optical density of each rectangle or to measure simultaneously the optical density of the rectangles of a given column, or alternatively to measure in a single operation the optical density of all the rectangles of the metaphase image. In the case in which the optical density of the rectangles of a given column is measured simultaneously, the images can move either in steps such that each step corresponds to the width of one column or continously, in which case one column is distinguished from another by means of a clock signal which thus defines the width of a column.

In a first alternative form, the desision algorithm consists in comparing one line with the preceding line and in retaining a line if this latter has a 1 a pre-established number of times in a column in which the preceding line already has a 1, in comparing a column with the previous one and in retaining said column if this latter has a 1 a pre-established number of times in a line in which the preceding column already has a 1, in selecting an image if a predetermined number of lines or of columns of said image has been retained.

In accordance with another alternative form, the algorithm consists in comparing the distribution of rectangles having the assigned value of 1 with a preset elementary configuration in respect of *p* lines and *q* columns of the image, and in selecting an image if it contains the elementary configuration a predetermined number of times. By way of example, said elementary configuration can be a rectangle extending over the portion which is common to $p$ lines and $q$ columns.

The device is characterized in that it comprises a column of $n$ optical detectors in aligned relation which are capable of converting an optical density into an electrical quantity, each detector being intended to cover one rectangle of the column and the complete set of $n$ detectors being intended to cover the entire column,

- means for relative displacement of the image with respect to the detectors in a direction at right angles to the detector column, said direction being known as the "line" direction,
- means for amplifying the $n$ signals delivered by the $n$ detectors,
- $n$ devices for comparing each signal with a maximum threshold value and a minimum threshold value,
- a binary coding assembly which gives the binary value 1 at each signal if it is comprised between the two threshold levels and the binary value 0 if it is located outside said threshold levels,
- a decision logic circuit.

The device therefore essentially comprises a column of $n$ detectors which covers the image in its direction parallel to the column of detectors, said detectors being intended to convert the light intensity into an electrical quantity. The biological preparations are placed on a sample-holder which is conveyed in continuous motion in front of the detectors. The signals delivered by the optical detectors are amplified and then compared with a maximum threshold level and a minimum threshold level. The binary value 1 is assigned to the signals which are comprised between said two levels. Said $n$ binary signals are processed by a decision logic circuit which utilizes either of the two decision algorithms. These devices essentially comprise logical gates, memories and counting registers.

The other particular characteristic features of the invention will be more clearly brought out by the following description of a number of embodiments of the invention which are given by way of example but not in any sense by way of limitation. Reference is made to the accompanying drawings, in which :

FIGS. 1$a$ and 1$b$ illustrate a method of the prior art ;

FIG. 2$a$ shows one example of construction of the device which employs the second decision algorithm ;

FIG. 2$b$ is a diagram which explains the operation of the device in accordance with the second algorithm ;

Figure 1A:
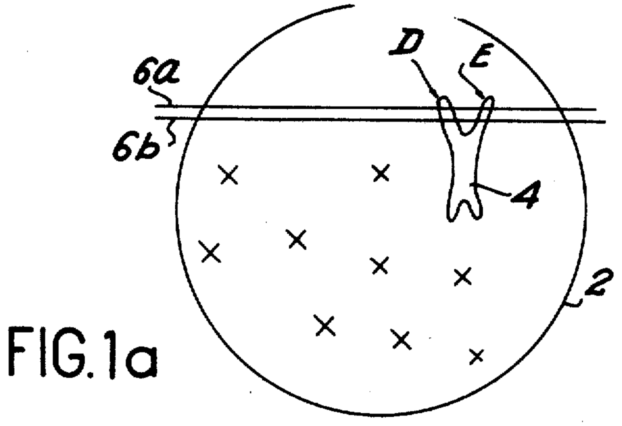

In the following description, the term "metaphase" will be understood to mean the biological preparation which contains the chromosomes and the phrase "metaphase image" will be understood to refer to the image of said preparation as produced by a microscope.

In order to control the homogeneity of a metaphase, the method according to the invention is divided into two steps. In a first step, a general test is made for homogeneity of the optical density of an elemental rectangle of the preparation or more precisely of the image of said rectangle which is produced by a microscope. If said elemental rectangle corresponds to good dispersion, that is to say if its optical density is comprised between a maximum threshold level and a minimum threshold level, the elemental rectangle is retained. In a second step, the configuration of the retained elemental rectangles is compared with a decision algorithm. It is readily apparent that the threshold levels as well as the algorithm are pre-established to ensure that the results produced by this method of selection should be in conformity with the results produced by a human selection.

In the first decision algorithm, two parameters of homogeneity are defined : the number of "correspondences" and the number of "similitudes." It will be said that a line has a "correspondence" with the preceding line if, in any one column, the binary value is 1 for the rectangles corresponding to the two lines. Since the number of "correspondences" is established by lines, the number of "similitudes" is likewise established column by column in accordance with an indentical definition. In other words, a column will be said to possess "similitude" with respect to the preceding column if, in any one line, the value is 1 for the two rectangles corresponding to the two columns.

A line is retained if it has at least $r$ "correspondences" with the preceding line. Similarly, a column is retained if it has at least $s$ "similitudes" with respect to the preceding column. Finally, an image is retained if the number of lines retained is higher than or equal to a preset number N or if the number of columns retained is higher than or equal to a present number M.

The second decision algorithm is constituted as follows :

if consideration is given to the binary matrix constituted by the complete set of rectangles to which is assigned the binary value 0 or 1, there is chosen as criterion of homogeneity of the detection image, in the initial binary matrix, a pattern constituting a decision grid, that is to say a particular configuration of 1. By way of example, this decision grid can be a square having dimensions of $3 \times 3$, or more generally a rectangle having dimensions of $p \times q$. If said pattern is present in the binary matrix, it will be said that it indicates at this locus a homogeneity of the optical density. The image will be retained if the number of loci in the entire binary matrix, taking into account all the overlaps, is higher than a pre-established number R.

The device is essentially made up of two sections :

- a first section in which is measured the optical density of each rectangle of the image to be tested and in which said optical density is compared with a higher threshold value and with a lower threshold value in order to retain the image or to reject it,
- a second section in which these data are processed in order to compare them with the decision algorithm.

The first section is common to the two alternative embodiments corresponding to each alternative form of method. On the contrary, the second section is different according as consideration is given to either the first or the second alternative form of the method.

The biological preparations to be tested, that is to say the metaphases, are present on a sample-holder which is displaced in continuous motion in front of the objective of a microscope, said sample-holder being driven by a reduction-gear motor at a constant but adjustable speed.

A linear matrix of photodiodes is placed in the image plane of the microscope which produces an image of the preparation to be tested. This matrix of photodiodes is made up of $n$ photodiodes (8*a*, 8*b*, . . . 8*n*) which are juxtaposed so that the line of the centers of said photodiodes 8 should be parallel to the plane of the sample-holder and perpendicular to the direction of displacement of said sample-holder. Moreover, the number $n$ of photodiodes 8 is such that the $n$ photodiodes cover substantially the entire image of the metaphase in its direction at right angles to the direction of displacement of the sample-holder. The term "column" will be employed hereinafter to designate a portion of the image which is limited by two lines parallel to the matrix of photodiodes ; and the term "line" will designate that portion of the image which is limited by two lines parallel to the direction of displacement of the sample-holder and which is located in the field of a photodiode. The width $d$ of a column will be defined hereinafter ; the line of the order $i$ and the column of the order $j$ thus define a rectangle $R_{ij}$.

Each of the $n$ photodiodes which converts into an electric signal the optical density of the image placed in its field is connected to an amplifier 10 of known type which serves to adjust the gain of the corresponding photodiode 8. Each amplified signal is introduced into a logic threshold circuit 12 which compares the level of the amplified signal with a maximum threshold value and with a minimum threshold value and delivers a binary signal 1 if the amplified signal is comprised between the two threshold values and the binary signal 0 if this is not the case.

It would clearly be possible to replace the photodiodes by phototransistors without thereby departing from the scope of the invention.

A device of this type is not illustrated in detail since it is in any case well known. For example, the device can be constructed by means of two threshold gates and one logic AND-gate.

The portion of the selecting device which has just been described is common to both embodiments ; in other words, this portion of the device is not dependent on the decision algorithm employed.

Figure 2B:
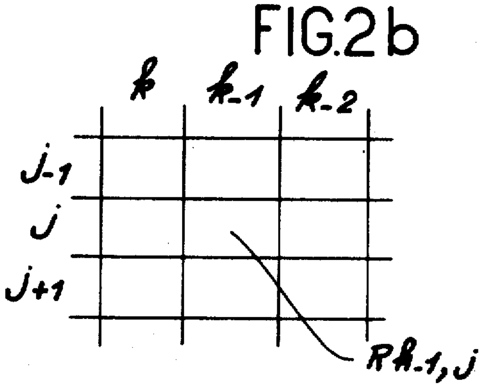
Figure 1B:
Figure 2A:
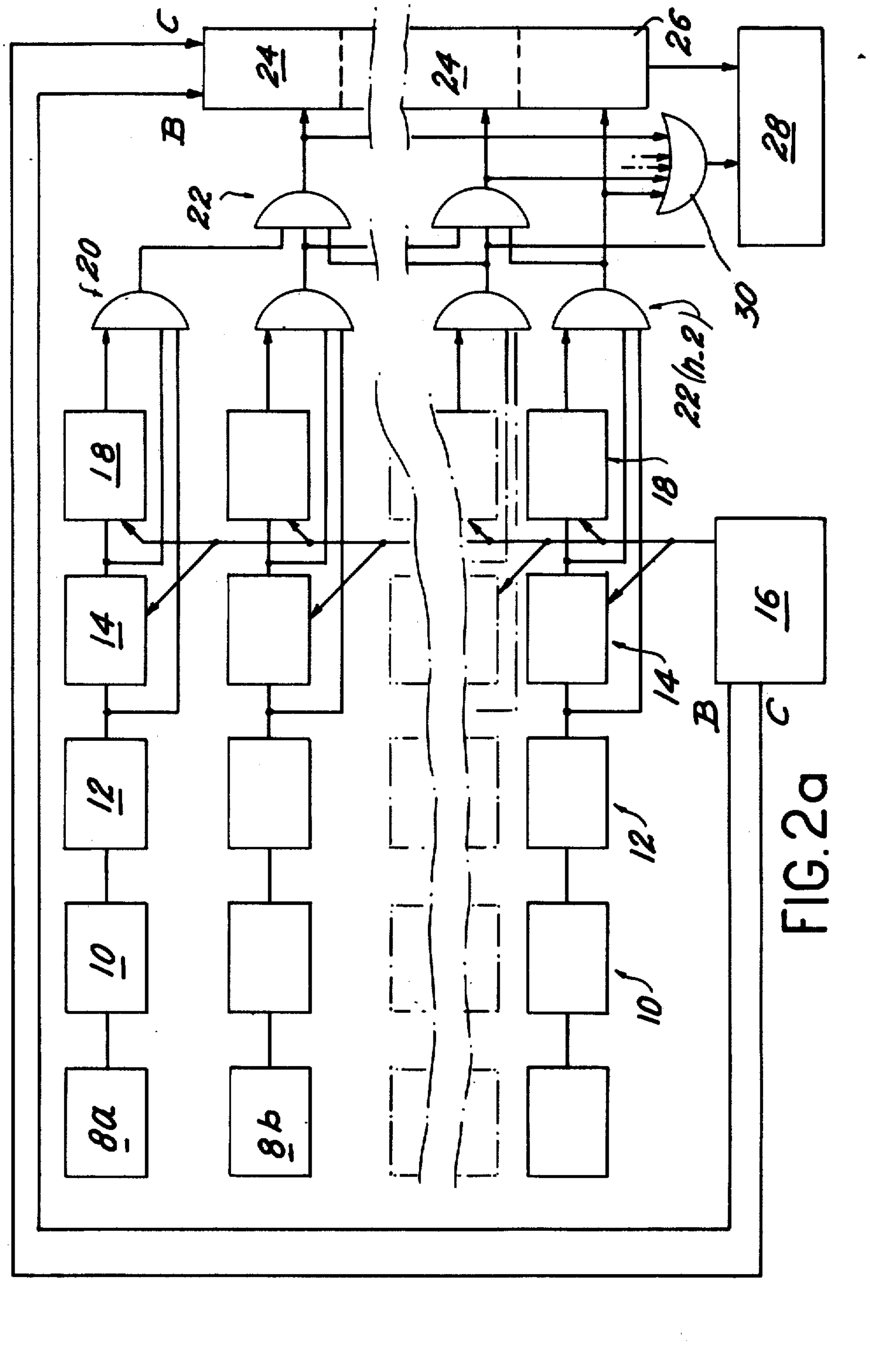

In FIG. 2*a*, there is shown one example of construction of the device in accordance with the second embodiment of the invention. In this example, a "locus" is a square having dimensions of 3 × 3. Thus, a "locus" will be counted if the binary value 1 is assigned to nine rectangles $R_{ij}$ covering a surface extending over the portion which is common to three adjacent lines and three adjacent columns ; and the image will be retained if the device counts R "loci."

Each threshold logic circuit 12 is connected to a first store or memory 14. Each memory 14 is controlled by a so-called "change of column" signal. This signal is produced by a signal sequencing device 16. The "change of column" signal A is made up of a train of pulses separated by a time interval which depends both on the rate of travel of the sample-holder and on the width to be given to the columns as hereinbefore defined. More precisely, if $v$ designates the rate of travel of the metaphase images and $d$ designates the width of a column, the period $T$ of the "change of column" signal is equivalent to :

$$T = d/v.$$

Each of the $n$ memories 14 is connected to a second memory 18 which is identical with the memories 14 and controlled by the "change of column" signal A. Each memory 18 is connected to an AND-gate 20. Each AND-gate 20 is also connected to the output of the logic threshold circuit 12 and to the output of the corresponding memory 14. The output signal of one of the three consecutive AND-gates 20 is applied to each of the three inputs of the AND-gates 22. For example, the AND-gate $22_1$ is connected to the outputs of the AND-gate $20_1$, AND-gate $20_2$ and AND-gate $20_3$, the AND-gate $22_2$ is connected to the AND-gate $20_2$, the AND-gate $20_3$ and the AND-gate $20_4$ and so on in sequence. There are thus $n-2$ AND-gates 22.

Figure 3:
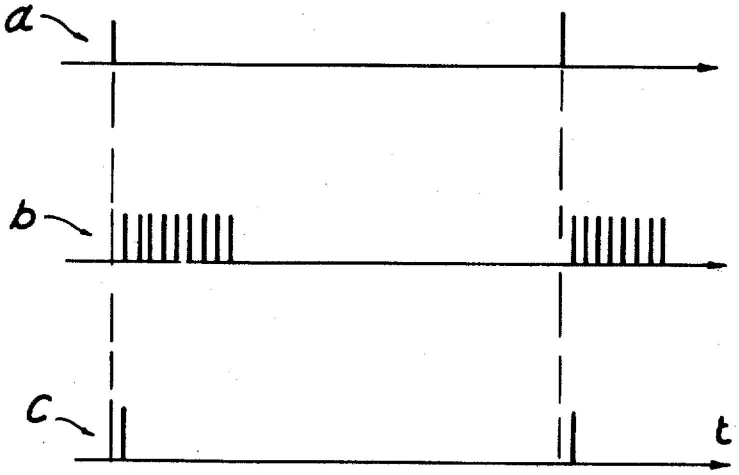
FIG. 3 is a diagram of time intervals of the control signals of the device shown in FIG. 2.

Each AND-gate 22 is connected to a cell 24 of a shift register 26 of known type. Access to the shift register is controlled by a "loading" signal B having the same period as the "change of column" signal A but having a slight lead with respect to this latter. The transfer of data which are stored in the shift register 26 into the counter 28 is controlled by a clock signal C constituted by groups of $n-2$ identical pulses, the first pulses of each group being such as to coincide with the pulse of the "change of column" signal A, the time interval which elapses between two successive pulses being smaller than $T/n$ if $T$ is the period of the "loading" signal B. There is shown in FIG. 3 the time diagram of the three control signals. The curve 3*a* represents the "loading" signal, the curve 3*b* represents the "clock" signal and the curve 3*c* represents the "change of column" signal. The sequencing device 16 can advantageously be formed by means of a generator which produces recurrent signals having a period equal to the period of the "clock" signal C ; the signals A and B can be produced in known manner by means of dividers. The outputs of the $n-2$ AND-gates 22 are also introduced at the $n-2$ inputs of a logic gate 30 which controls the zero resetting of a counter 28 if the $n-2$ signals introduced at the inputs of the gate 30 have the binary value 0.

The counter 28 additionally comprises at its output a system for comparing its state with a preset number R.

The operation of the device shown in FIG. 2*a* is as follows : the optical density of each line is measured by the corresponding photodiode 8 and converted to an electric signal ; this latter is amplified and compared with the two threshold levels and then, depending on its position with respect to said two levels, converted to a binary signal which is fed into the memory 14 and into the corresponding AND-gate 20. As long as no pulse of the "change of column" signal A is applied to the control inputs of the memories 14, and AND-gates 20 deliver the binary signal 0.

Postulating that the matrix of photodiodes 8 scans the column $k$, the signals corresponding to the column $k-l$ are therefore stored in the memories 14 and the signals corresponding to the column $k-2$ are stored in the memories 18. At the following "change of column" pulse, each AND-gate 20 is driven by the signals corresponding to the columns $k-2$, $k-1$, and $k$. In consequence, the signal 1 will appear at the output of the AND-gate $20_i$ (corresponding to the line $i$) only if the columns $k-2$, $k-1$ and $k$ are also in state 1, that is to say if the rectangles $R_{i,k}$, $R_{i,k-1}$ and $R_{i,k-2}$ have a suitable homogeneity. At the output of the AND-gate $22_j$ which is connected to the AND-gate $20_{j-1}$, the AND-gate $20_j$ and the AND-gate $20_{j+1}$, the signal 1 appears if the AND-gates 20 aforesaid also have the signal 1 at their outputs. In consequence, we have the signal 1 at the output of the AND-gate $22_j$ if all the signals corresponding to the rectangles $R_{j-1,k-2}$, $R_{j-1,k-1}$, $R_{j-1,k}$, $R_{j,k-2}$, $R_{j,k-1}$, $R_{j,k}$, $R_{j+1,k-2}$, $R_{j+1,k-1}$ and $R_{j+1,k}$ have the value of 1. This in fact corresponds to a "locus" having dimensions of 3 × 3. There are shown in FIG. 2b the rectangles $R_{1,j}$ corresponding to the columns $k-2$, $k-1$, $k$ and to the lines $j-1$, $j$ and $j+1$. It is readily apparent that the contours of the rectangles shown in this figure do not exist physically and that they are given solely in order to enhance the clarity of the figure. The states of the outputs of the AND-gates 22 are stored in the cells 24 of the shift register 26, whereupon the states 1 contained in the shift register are transferred into the counter 28 by the "clock" signal C.

At the time of the following "change of column" pulse, the states of signals corresponding to the columns $k$ and $k-1$ are stored respectively in the memories 14 and 18 and the cycle begins again.

If the counter 28 has counted R states 1, the image is retained.

The preparations which are present on the sampleholder are separated by a predetermined time interval. In consequence, when the matrix of photodiodes passes from one image to the next, said matrix detects a number of columns of "blanks." Said columns of blanks generate the signal 0 in the case of each photodiode 8. The logic gate 30 has the value 0 at each of its $n-2$ inputs and the counter 28 is therefore reset to zero.

In the example hereinabove described, each "locus" is constituted by a square having dimensions of 3 × 3 but it will be readily apparent that, by making a very slight modification in the decision logic, the "locus" can be given more generally the shape of a rectangle having dimensions of $p \times q$.

In this case, instead of having two memories for each photodiode 8, there are $q-1$ memories ; similarly, each of the $n$ AND-gates 20 has $q$ inputs instead of having three inputs and each AND-gate 22 has $p$ inputs, the number of AND-gates 22 being $n-p+1$.

Figure 4:
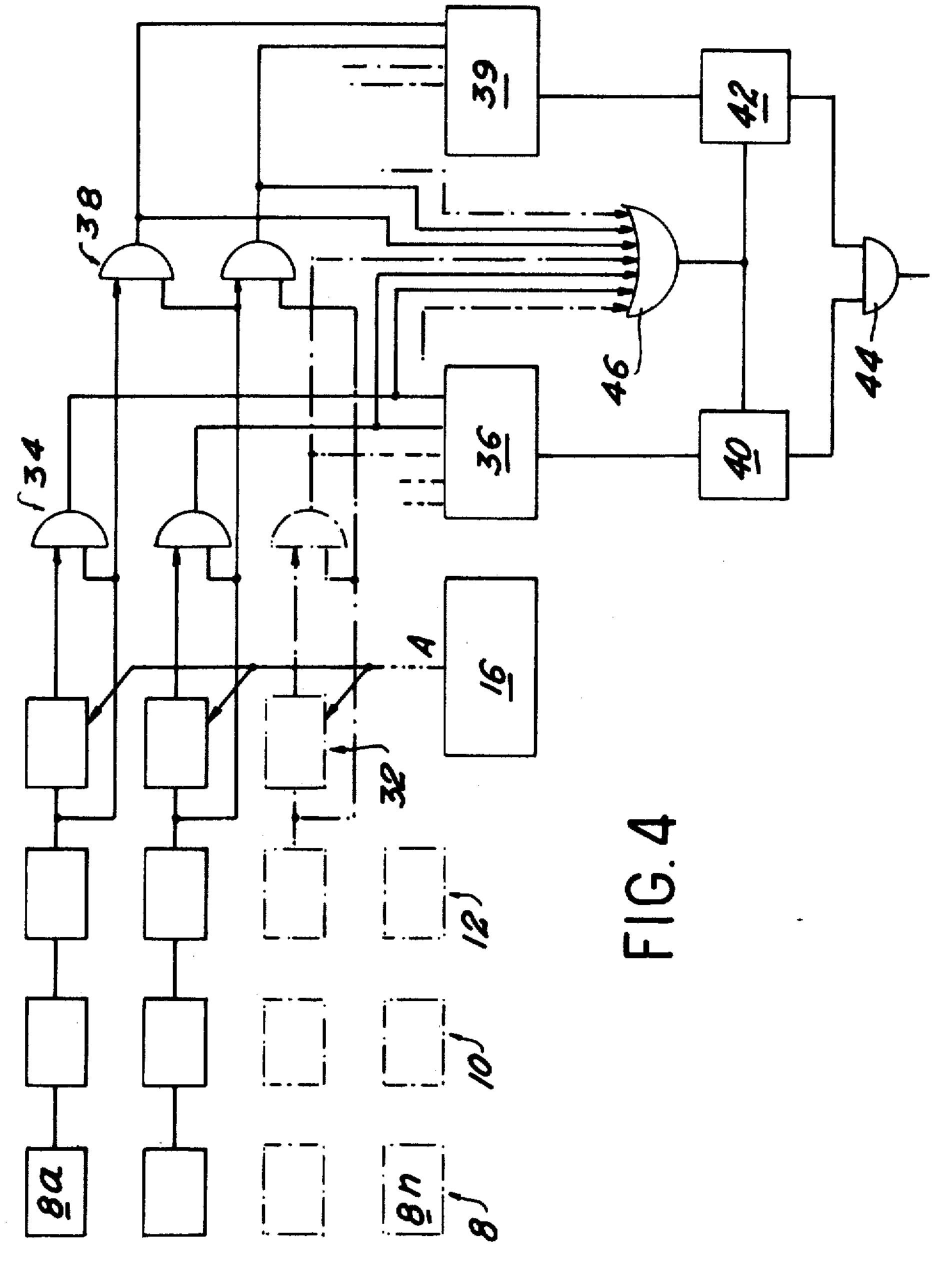
FIG. 4 shows one example of construction of the device which employs the first decision algorithm.

There is shown in FIG. 4 one form of construction of the device in accordance with the first alternative embodiment of the invention. In this alternative form, a column is retained if it has $r$ "similitudes" and a line is retained if it has s "correspondences." Finally, an image is considered to be homogeneous and is therefore retained if M lines or N columns have already been retained for this image.

There can again be seen in FIG. 4 the $n$ photodiodes 8, the $n$ amplifiers 10 and the $n$ threshold logic circuits 12. The outputs of the $n$ threshold circuits 12 are connected to $n$ memories 32 which are controlled by the "change of column" signal. The output of each memory 32 is connected to one of the two outputs of the $n$ AND-gates 34, the other input of which is connected to the input of the corresponding memory 32. The outputs of the $n$ AND-gates 34 are fed to the $n$ inputs of a counter 36 which is preset at the value $r$ and delivers the signal 1 at its output when it has counted $r$ states 1.

Said counter 36 can advantageously be formed by associating as in FIG. 2a a counter 28, a shift register 26 and a device for comparing the state of the counter 28 with the number $r$. Each of the $n-1$ AND-gates 38 is driven on the one hand by the signal which is delivered by the corresponding threshold logic circuit 12 and on the other hand by the signal delivered by the threshold logic circuit 12 which immediately follows this latter.

The outputs of the $n-1$ AND-gates 38 are applied to the $n-1$ inputs of the counter 39 which is identical with the counter 36 but preset at the value $s$. The output of the counter 36 is connected to the input of a counter 40 which is preset at the value M, and the output of the counter 39 is connected to the input of the counter 42 which is preset at the value N. The output of the counter 40 therefore delivers the signal 1 when it has counted M pulses and the output of the counter 42 delivers the signal 1 when it has counted N pulses.

The outputs of the counters 40 and 42 are fed into an OR-gate 44 which delivers the output signal of the device. In addition, the outputs of the $n$ AND-gates 34 and of the $n-1$ AND-gates 38 drive an AND-gate 46 having $2n-l$ inputs, the output of said gate being connected to the reset controls of the counters 40 and 42.

The operation of the alternative embodiment of the device illustrated in FIG. 4 is as follows :

It is assumed that the matrix of photodiodes is scanning the column of the order $k$, the states of the signals corresponding to the column of the order $k-1$ being stored in the memories 32.

The AND-gate $34_i$ delivers the signal 1 if the signals corresponding to the columns $k$ and $k-1$ have the value 1, that is to say if there is a "correspondence." The counter 36 counts the number of AND-gates 34 in state 1. If this number of gates is either equal to or higher than $r$, the counter 36 delivers the signal 1. The AND-gate $38_j$ delivers the signal 1 if the threshold logic circuits $12_j$ and $12_{j+1}$ also deliver the signal 1, that is to say if there is a "similitude" along the column $k$. The counter 39 counts the number of AND-gates 38 which deliver the signal 1. When this number attains the value $s$, said counter in turn delivers a pulse.

When a further "change of column" pulse is applied to the control inputs of the memories 32, the same process begins again with the columns $k+1$ and $k$.

When the counter 40 has counted M pulses, it delivers a signal 1, and the same applies to the counter 42 when this latter has counted N pulses. The output signals of the two counters are fed into the OR-gate 44. If this latter delivers the signal 1, the corresponding image exhibits good homogeneity and is accordingly retained.

The device in accordance with the invention can also comprise a system for locating the coordinates of selected images. When the photodiodes pass from one image to another, a coder generates a signal which is characteristic of the abscissa and of the ordinate of the image with respect to the sample-holder, and these two signals are applied to the input of a buffer memory.

In the case of the alternative embodiment shown in FIG. 4, the control input is connected to the output of the OR-gate 44. If the signal has the value of 1 at the output of said gate, the coordinates X and Y of the image are stored in the buffer memory. In the case of the alternative embodiment illustrated in FIG. 2, the control input of the buffer memory is connected to the output of the counter 28.

The two alternative forms of the device have been tested by performing a simulation in a computer. The results obtained from 200 images were in complete agreement with the results given by a group of five biologists.

It is wholly apparent that the present invention is not limited to the example which has been more especially described with reference to the drawings but extends to all alternative forms. In particular, it would not constitute a departure from the invention to replace the photodiodes by other optical detectors for delivering an electric signal which is proportional to the optical density of an image (phototransistors and the like).

Similarly, instead of conveying the samples in continuous motion in front of the fixed objective lens of the microscope, it would be wholly feasible to cause displacement of the microscope in front of the preparations to be tested, said preparations being accordingly placed on a stationary sample-holder.

In other applications, the pattern which constitutes the decision grid can have any desired configuration. Said pattern is made up of an array of elemental rectangles forming a definite figure which is correlated with the image to be selected and which can be a typographic character, for example.

What we claim is:

1. A method for the automatic selection of metaphase images contained in a preparation, comprising the steps of:

subdividing each image of the preparation to be tested step by step in a lattice of adjacent rectangles which are distributed in lines and columns, measuring the optical density of each rectangle and assigning the binary value of 1 to each of said rectangles if the optical density thereof is within a range limited by two preset threshold levels and assigning the value 0 thereto if said optical density is not within said range, identifying a characteristic spatial dispersion among the rectangles having the assigned value of 1.

2. A method of selection according to claim 1, wherein the lattice subdivision of the surface to be tested is carried out by continuous scanning of said surface which is displaced in uniform motion along the lines, the binary value 0 or 1 being progressively assigned to each rectangle of the surface in the case of all the rectangles of a given fixed column.

3. A method according to claim 1, wherein said identifying step comprises:

comparing one line with the preceding line and in retaining a line if this latter exhibits a pre-established number of times $r$ a rectangle having the assigned value of 1 in a column in which the preceding line already exhibits a rectangle having the assigned value of 1, comparing one column with the preceding column and retaining said column if this latter exhibits a 1 a pre-established number of times $s$ in a line in which the preceding column already exhibits a 1, and selecting an image if a predetermined number M of columns N or of lines of said image has been retained.

4. A method according to claim 1, wherein said identifying step comprises comparing the distribution of rectangles having the assigned value of 1 with an elementary configuration consisting of a rectangle extending over the portion which is common to $p$ consecutive lines and $q$ consecutive columns, and selecting an image if said image contains the elementary configuration a predetermined number of times R.

5. A device for automatically selecting metaphase images contained in a preparation wherein said device comprises:

a column of $n$ optical detectors capable of converting an optical density into an electrical quantity, each detector being intended to cover one rectangle of the column and the $n$ detectors being intended to cover one complete column of the image;

means for providing relative displacement of the image with respect to the detectors in a direction at right angles to the column of detectors, said direction being known as the "line" direction;

means for amplifying the $n$ signals delivered by the $n$ detectors;

$n$ devices for comparing each signal with a maximum threshold value and a minimum threshold value;

a binary coding assembly which gives the binary value 1 at each signal if it is between the two threshold levels and the binary value 0 if it is located outside said threshold levels; and means for identifying a characteristic spatial dispersion among the rectangles affected by the binary value 1.

6. A device according to claim 5, wherein said identifying means comprises:

$n$ memories controlled by a change of column signal;

$n$ means for comparing the signal stored in each memory with the signal delivered by the corresponding threshold device;

a counter having $n$ inputs and preset at the value $r$, each input of which is connected to one of said comparison means, the output of said counter being connected to the input of a counter which is preset at the value M;

$n-1$ means for comparing the signal delivered by the threshold logic circuit of the order $i$ with the signal delivered by the threshold logic circuit of the order $i + 1$;

a counter having $n-1$ inputs and preset at the value $s$, each input of which is connected to $n-1$ comparison means, the output of said counter being connected to the input of a counter which is preset at the value N;

an OR-gate, one of the inputs of which is connected to the output of the counter having a preset value M and the other input of which is connected to the output of the counter having a preset value N, the output of the OR-gate being intended to constitute the output of the system.

7. A device according to claim 5, wherein said identifying means comprises:

$n$ groups of $q-1$ memories mounted in series, each group being connected to one of the inputs of said identifying means and each memory being controlled by a change of column signal;

$n$ comparison means having $q$ inputs for comparing the $q-1$ signals stored in the $q-1$ memories with the signal delivered by the corresponding threshold device;

$n-p+1$ comparison means having $p$ inputs, each input of which is driven by the output of one of the consecutive $p$ comparison means having $q$ inputs, the output of each $n-p+1$ comparison means having $p$ inputs being connected to the input of one of the $n-p+1$ cells of a shift register whose output is connected to the input of a counter which is preset at the value R.

8. A device according to claim 5, wherein the column of optical detectors is placed in the image plane of a stationary microscope, the sample-holder for supporting the preparations to be tested being driven in translational motion at constant speed by a reduction-gear motor.

9. A device according to claims 5, wherein the optical detectors are photodiodes.

10. A device according to claim 5, wherein the optical detectors are phototransistors.

11. A device according to claim 5, wherein the comparison means are AND-gates.

* * * * *